US011086962B2

(12) United States Patent
Luo

(10) Patent No.: US 11,086,962 B2
(45) Date of Patent: Aug. 10, 2021

(54) WEBPAGE LOADING METHOD, CLIENT AND SERVER

(71) Applicant: UC Mobile Co., Ltd., Beijing (CN)

(72) Inventor: Wenping Luo, Beijing (CN)

(73) Assignee: UC Mobile Co., Ltd., Beijing (CN)

(*) Notice: Subject to any disclaimer, the term of this patent is extended or adjusted under 35 U.S.C. 154(b) by 268 days.

(21) Appl. No.: 15/156,674

(22) Filed: May 17, 2016

(65) Prior Publication Data

US 2016/0259800 A1 Sep. 8, 2016

Related U.S. Application Data

(63) Continuation of application No. PCT/CN2014/078714, filed on May 28, 2014.

(30) Foreign Application Priority Data

Nov. 26, 2013 (CN) .......................... 201310612883.7

(51) Int. Cl.
G06F 16/958 (2019.01)
G06F 16/9535 (2019.01)
(Continued)

(52) U.S. Cl.
CPC ........ G06F 16/958 (2019.01); G06F 16/9535 (2019.01); G06F 16/9574 (2019.01);
(Continued)

(58) Field of Classification Search
CPC ......... G06F 17/30902; G06F 17/30386; G06F 17/30867; G06F 17/3089; G06F 12/0862;
(Continued)

(56) References Cited

U.S. PATENT DOCUMENTS 7,146,429 B2* 12/2006 Michel .............. H04L 29/12009
709/238
8,533,393 B1* 9/2013 Cote .................... G06F 12/0804
711/118
(Continued)

FOREIGN PATENT DOCUMENTS

CN 101710327 5/2010
CN 102375882 3/2012
(Continued)

OTHER PUBLICATIONS

International Search Report for PCT/CN2014/078714, dated Sep. 3, 2014.
(Continued)

Primary Examiner — Jason D Recek
Assistant Examiner — Ranjan Pant
(74) Attorney, Agent, or Firm — Sheppard Mullin Richter & Hampton LLP

(57) ABSTRACT

The present invention discloses a webpage loading method, a client terminal and a server. The webpage loading method includes: receiving, by a client terminal, a webpage accessing request input by a user; searching locally, by the client terminal, for a reference webpage meeting a preset match condition with the webpage; sending, by the client terminal, the webpage accessing request to a server, and notifying, by the client terminal, the server to use the reference webpage as a reference; receiving, by the client terminal, differential data from the server; and loading, by the client terminal, to obtain a complete webpage according to the reference webpage and the differential data. By means of the present invention, transmission resources can be saved during transmission of webpage resources.

15 Claims, 5 Drawing Sheets

(51) Int. Cl.
*G06F 16/957* (2019.01)
*H04L 29/08* (2006.01)
*H04L 29/06* (2006.01)

(52) U.S. Cl.
CPC .............. *H04L 29/08* (2013.01); *H04L 67/02* (2013.01); *H04L 67/42* (2013.01)

(58) Field of Classification Search
CPC .............. G06F 12/10; G06F 17/30864; G06F 2212/6024; G06F 2212/6026; G06F 17/30; G06F 17/30336; G06F 16/958; G06F 16/9535; G06F 16/9574; G06Q 30/02; H04L 67/02; H04L 67/306; H04L 67/42; H04L 29/08
See application file for complete search history.

(56) References Cited

U.S. PATENT DOCUMENTS

| | | | |
|---|---|---|---|
| 8,972,453 B2 * | 3/2015 | Wu ................ | G06F 16/13 707/797 |
| 2002/0133570 A1 * | 9/2002 | Michel ............ | H04L 29/12009 709/219 |
| 2003/0009453 A1 * | 1/2003 | Basso ............. | H04L 29/12132 |
| 2004/0019697 A1 * | 1/2004 | Rose ............... | H04L 29/12594 709/245 |
| 2007/0050320 A1 * | 3/2007 | Carrier ........... | G06F 16/84 |
| 2007/0106748 A1 * | 5/2007 | Jakobsson ....... | H04L 63/0807 709/217 |
| 2007/0143439 A1 * | 6/2007 | Szabo ............. | G06Q 30/02 709/217 |
| 2007/0206221 A1 * | 9/2007 | Wyler ............. | G06F 16/9577 358/1.15 |
| 2009/0019133 A1 * | 1/2009 | Brimley .......... | G06F 16/9574 709/218 |
| 2009/0249179 A1 * | 10/2009 | Shieh .............. | G06F 16/9562 715/206 |
| 2010/0057847 A1 * | 3/2010 | He .................. | H04L 67/42 709/203 |
| 2010/0082637 A1 * | 4/2010 | Mishne ........... | G06F 16/9535 707/748 |
| 2010/0088612 A1 * | 4/2010 | Jia .................. | G06F 16/9574 715/745 |
| 2010/0205239 A1 * | 8/2010 | Greiner .......... | G06F 16/9574 709/203 |
| 2011/0191321 A1 * | 8/2011 | Gade .............. | G06F 3/14 707/709 |
| 2011/0238924 A1 * | 9/2011 | Hampton ........ | H04L 67/02 711/138 |
| 2012/0233199 A1 * | 9/2012 | Jenkins .......... | H04L 29/08729 707/769 |
| 2012/0245988 A1 * | 9/2012 | Pace ............... | G06Q 30/0283 705/14.25 |
| 2012/0330982 A1 * | 12/2012 | Arnaud ........... | G06F 16/3332 707/755 |
| 2013/0103757 A1 * | 4/2013 | Mitchell ......... | G06Q 50/01 709/204 |
| 2013/0138795 A1 * | 5/2013 | Field .............. | H04N 21/2221 709/224 |
| 2013/0151779 A1 * | 6/2013 | Daly ............... | G06F 12/0897 711/122 |
| 2014/0089344 A1 * | 3/2014 | Hong .............. | G06F 16/9566 707/772 |
| 2014/0129580 A1 * | 5/2014 | Xiao ............... | G06F 16/9566 707/758 |
| 2014/0143647 A1 * | 5/2014 | Reshadi .......... | H04L 67/02 715/234 |
| 2014/0379841 A1 * | 12/2014 | Zong .............. | H04L 67/02 709/213 |
| 2015/0012533 A1 * | 1/2015 | Wang ............. | H04L 67/02 707/736 |
| 2015/0019674 A1 * | 1/2015 | Le Van Gong .. | H04L 67/2852 709/213 |
| 2016/0191606 A1 * | 6/2016 | Lu ................. | H04L 61/1558 709/213 |

FOREIGN PATENT DOCUMENTS

| | | | | |
|---|---|---|---|---|
| CN | 102591954 | A | 7/2012 | |
| CN | 102591963 | | 7/2012 | |
| CN | 102760133 | A | 10/2012 | |
| CN | 103024013 | A | 4/2013 | |
| CN | 103207874 | A | 7/2013 | |
| CN | 103593466 | A | 2/2014 | |
| WO | WO 2015043428 A1 * | | 4/2015 | ....... G06F 17/30902 |
| WO | WO-2015043428 A1 * | | 4/2015 | ........ G06F 17/30902 |

OTHER PUBLICATIONS

International Written Opinion for PCT/CN2014/078714, dated Sep. 3, 2014.
International Preliminary Report on Patentability for PCT/CN2014/078714, dated May 31, 2016, 7 pages.
First Notice issued by China State Intellectual Property Office, dated Apr. 28, 2016 for Chinese Patent Application No. 201310612883.7 with search report.
Second Notice issued by China State Intellectual Property Office, dated Dec. 30, 2016 for Chinese Patent Application No. 201310612883.7 with search report.
International Search Report and Written Opinion for PCT/CN2014/078714, dated Sep. 3, 2014, 14 pages.
First Examination Report dated Dec. 30, 2020, issued in related Indian Patent Application No. 201647018477, with English translation (7 pages).

* cited by examiner

WEBPAGE LOADING METHOD, CLIENT AND SERVER

CROSS-REFERENCE TO RELATED APPLICATIONS

This application is continuation application of International Application No. PCT/CN2014/078714, filed on May 28, 2014, which claims priority to and benefits of Chinese Patent Application No. 201310612883.7, filed on Nov. 26, 2013. The contents of the above-referenced applications are incorporated herein by reference in their entirety.

TECHNICAL FIELD

The present invention relates to the field of mobile Internet, and in particular, to a webpage loading method, a client terminal and a server.

BACKGROUND

The Internet is filled with a large amount of webpage resources, and the webpage resources are all written according to a unified specification and standard. From the perspective of data transmission, transmission of text content written according to the unified standard is highly repetitive, and numerous template base data and excellent page structures existing in web site construction are generally learned and simulated, and all these result in a higher repeated level of webpage data with different web addresses. In the current technology, a browser considers that webpage resources having different web addresses are completely disconnected, and ignores the repeatability of data. The inventor finds that repeated transmission on the repeated data not only wastes transmission resources, but also reduces the webpage presentation speed.

With respect to the problems in the prior art of wasting transmission resources during webpage resource transmission, currently, there is no effective solution.

SUMMARY

One objective of the present disclosure is to provide a webpage loading method, a client terminal and a server, to solve the problem in the prior art that transmission resources are wasted during webpage resource transmission.

To implement the above objective, according to one aspect of the present invention, a webpage loading method is provided. The webpage loading method includes: acquiring, by a client terminal, a webpage accessing request input by a user; searching locally, by the client terminal, according to the request, for a reference webpage meeting a preset match condition with the webpage; sending, by the client terminal, the webpage accessing request to a server, and notifying, by the client terminal, the server to use the reference webpage as a reference; acquiring, by the client terminal, differential data from the server, where the differential data is difference data between the webpage and the reference webpage; and loading, by the client terminal, to obtain a complete webpage according to the reference webpage and the differential data.

Furthermore, the step of searching locally, by the client terminal, according to the request, for a reference webpage meeting a preset match condition with the webpage includes: searching, by the client terminal, according to the request, locally cached page resources for a cached page according to an inverted time sequence of accessing; determining, by the client terminal, whether the found cached page meets the preset match condition with the webpage; and using, by the client terminal, the cached page meeting the preset match condition as the reference webpage.

Moreover, determining, by the client terminal, whether the found cached page meets the preset match condition with the webpage includes: starting, by the client terminal, matching determination on whether the found cached page meets the preset match condition with the webpage from the longest path, where the path is a storage path of the cached page; and if no cached page meeting the preset match condition is found according to the current path matching, continuing, by the client terminal, matching determination on whether the found cached page meets the preset match condition with the webpage on a shorter level of path.

Furthermore, before sending, by the client terminal, the webpage accessing request to a server, and notifying, by the client terminal, the server to use the reference webpage as a reference, the webpage loading method includes: establishing a mapping relationship between the webpage and a reference webpage; after the establishing a mapping relationship between the webpage and a reference webpage, the step of sending, by the client terminal, the webpage accessing request to a server, and notifying, by the client terminal, the server to use the reference webpage as a reference includes: acquiring a reference webpage corresponding to the webpage according to the mapping relationship; and after loading, by the client terminal, to obtain a complete webpage according to the reference webpage and the differential data, the webpage loading method includes: deleting the mapping relationship between the webpage and the reference webpage.

To implement the above objective, according to another aspect of the present invention, a client terminal is provided. The client terminal, according to one aspect of the present invention, includes: a first acquiring unit, for acquiring a webpage accessing request input by a user; a searching unit, for searching locally, according to the request, for a reference webpage meeting a preset match condition with the webpage; a requesting unit, for sending the webpage accessing request to a server, and notifying the server to use the reference webpage as a reference; a second acquiring unit, for acquiring differential data from the server, where the differential data is difference data between the webpage and the reference webpage; and a loading unit, for loading to obtain a complete webpage according to the reference webpage and the differential data.

Furthermore, the searching unit includes: a searching module, for searching, according to the request, local cached page resources for a cached page according to an inverted time sequence of accessing; a determining module, for determining whether the found cached page meets the preset match condition with the webpage; and a confirming module, for using the cached page meeting the preset match condition as the reference webpage.

Moreover, the determining module includes: a first determining sub-module, for starting matching determination on whether the found cached page meets the preset match condition with the webpage from the longest path, where the path is a storage path of the cached page; and a second determining sub-module, for: if no cached page meeting the preset match condition is found according to the current path matching, continuing matching determination on whether the found cached page meets the preset match condition with the webpage on a shorter level of path.

Furthermore, the client terminal further includes: a mapping unit, for establishing a mapping relationship between the webpage and a reference webpage before the requesting unit sends the webpage accessing request to the server and notifies the server to use the reference webpage as a reference; and a deleting unit, for deleting the mapping relationship between the webpage and the reference webpage after the loading unit loads to obtain a complete webpage according to the reference webpage and the differential data, where the confirming module is further for acquiring the reference webpage corresponding to the webpage according to the mapping relationship.

To implement the above objective, according to another aspect of the present invention, a webpage loading method is provided. The webpage loading method includes: receiving, by a server, a request and a notification from a client terminal, the request being a webpage accessing request and the notification being a notification notifying the server to use a reference webpage as a reference, and receiving, by the server, the reference webpage meeting a preset match condition with the webpage and returned by the client terminal; and sending, by the server, differential data to the client terminal, so that the client terminal loads to obtain a complete webpage according to the reference webpage and the differential data, where the differential data is difference data between the webpage and the reference webpage.

To implement the above objective, according to another aspect of the present invention, a server is provided. The server according to one aspect of the present invention includes: a receiving unit, for receiving a request and a notification from a client terminal, the request being a webpage accessing request and the notification being a notification notifying the server to use a reference webpage as a reference, and receiving the reference webpage meeting a preset match condition with the webpage and returned by the client terminal; and a sending unit, for sending differential data to the client terminal, so that the client terminal loads to obtain a complete webpage according to the reference webpage and the differential data, where the differential data is difference data between the webpage and the reference webpage.

To implement the above objective, according to another aspect of the present invention, a computer readable storage medium having program code executable by a processor is provided, and when being executed, the program code enables the processor to execute the following steps: acquiring a webpage accessing request input by a user; searching locally, according to the request, for a reference webpage meeting a preset match condition with the webpage; sending the webpage accessing request to a server, and notifying the server to use the reference webpage as a reference; acquiring differential data from the server, where the differential data is difference data between the webpage and the reference webpage; and loading to obtain a complete webpage according to the reference webpage and the differential data.

To implement the above objective, according to another aspect of the present invention, a computer readable storage medium having program code executable by a processor is provided, and when being executed, the program code enables the processor to execute the following steps: receiving a request and a notification from a client terminal, the request being a webpage accessing request and the notification being a notification notifying the server to use a reference webpage as a reference, and receiving the reference webpage meeting a preset match condition with the webpage and returned by the client terminal; and sending differential data to the client terminal, so that the client terminal loads to obtain a complete webpage according to the reference webpage and the differential data, where the differential data is difference data between the webpage and the reference webpage.

To implement the above objective, according to another aspect of the present invention, a computer program is provided, and the computer program is used for executing the webpage loading methods provided in the present disclosure.

By means of the method in the exemplary embodiments of present invention, a client terminal receives a webpage accessing request input by a user; the client terminal searches locally for a reference webpage meeting a preset match condition with the webpage; the client terminal sends the webpage accessing request to a server, and notifies the server to use the reference webpage as a reference; the client terminal receives differential data from the server, where the differential data is difference data between the webpage and the reference webpage; and the client terminal loads to obtain a complete webpage according to the reference webpage and the differential data. Therefore, the problem in the conventional technology of wasting transmission resources during webpage resource transmission is solved, thereby further achieving the effect of saving transmission resources during webpage resource transmission.

BRIEF DESCRIPTION OF THE DRAWINGS

The accompanying drawings constructing a part of the present application are used to provide further understanding of the present invention, and exemplary embodiments and illustrations thereof of the present invention are used to explain the present invention, and are not intended to form improper limitation on the present invention. In the accompanying drawings.

DETAILED DESCRIPTION

It should be noted that embodiments in the present application and features in the embodiments may be combined together if there are no conflicts among them. The present invention will be described in detail through the accompanying drawings and the embodiments.

In order that persons skilled in the art can better understand the solution in the present invention, the technical solutions in the embodiments of the present invention will be described clearly and completely through the accompanying drawings in the embodiments of the present invention. Apparently, the described embodiments are merely a part of embodiments of the present invention, and are not all the embodiments. Based on the embodiments of the present invention, all other embodiments derived by persons of ordinary skill in the art without any creative effort shall all fall within the protection scope of the present invention.

It should be noted that, terms such as "first" and "second" in the specification, the claims, and the accompanying drawings of the present invention are used to distinguish similar objects, and are not intended to describe specific sequence or order. It should be understood that data used in this manner can be exchanged in suitable situations, so that embodiments of the present invention described herein can be implemented in sequences other than those shown or described herein. Moreover, terms "include" and "have" and any variation thereof are intended to cover non-exclusive including, for example, a process, method, system, product or device including a series of steps or units, not limited to those steps or units expressly listed, but also including other steps or units that are not expressly listed or inherent for the process, method, product or device.

Figure 1:
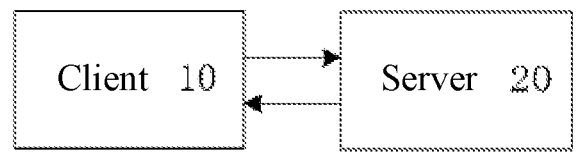
FIG. 1 is a schematic diagram of data transmission flow between a client terminal and a server according to an embodiment of the present invention.

FIG. 1 is a schematic diagram of performing data transmission between a client terminal and a server according to an embodiment of the present invention. In the embodiment of the present invention, loading of a webpage is implemented by using data transmission between a client terminal 10 and a server 20. Specifically, the client terminal 10 and the server 20 perform data transmission in the following manner:

The client terminal 10 receives a webpage accessing request from a user; after receiving the accessing request of the user, the client terminal 10 searches locally for a reference webpage meeting a preset match condition with the webpage, and receives the reference webpage meeting the preset match condition with the webpage and returned by the client terminal, where the request is the webpage accessing request. After receiving the accessing request of the user and finds the reference webpage, the client terminal 10 sends to the server 20 the webpage accessing request and a notification that a reference webpage is found to serve as a reference.

The server 20 receives the request and the notification from the client terminal 10, where the request is the webpage accessing request of the client terminal 10, and the notification is a notification of the client terminal 10 notifying the server 20 to use the reference webpage as a reference. After receiving the webpage accessing request input by the user, the client terminal 10 searches locally for the reference webpage meeting the preset match condition with the webpage, where the request is the webpage accessing request.

The server 20 sends differential data to the client terminal 10, so that the client terminal 10 loads to obtain a complete webpage according to the reference webpage and the differential data, where the differential data is difference data between the webpage and the reference webpage.

After receiving the notification sent by the client terminal 10 that the reference webpage is found to serve as the reference, the server 20 obtains the differential data according to the webpage and the reference webpage, and sends the obtained differential data to the client terminal 10, so that the client terminal 10 can load to obtain a complete webpage according to the received differential data and the reference webpage found in locally cached pages.

In some embodiments of the present invention, by means of the data transmission method, if a reference webpage can be found locally, the server 20 merely sends differential data to the client terminal 10, and it is unnecessary to send whole page content of the webpage, thereby significantly saving transmission resources, and improving the webpage loading speed.

An embodiment of the present invention further provides a server. The server may be the server in the embodiment shown in FIG. 1.

Figure 2:
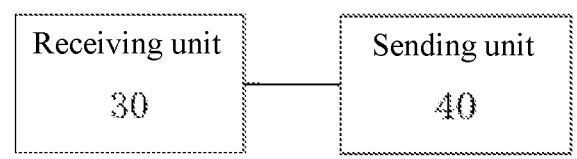
FIG. 2 is a schematic diagram of a server according to an embodiment of the present invention.

FIG. 2 is a schematic diagram of a server according to an embodiment of the present invention. As shown in the drawing, the server 20 includes a receiving unit 30 and a sending unit 40.

The receiving unit 30 is configured to receive a request and a notification from a client terminal 10, where the request is a webpage accessing request of the client terminal 10, and the notification is a notification of the client terminal 10 notifying the server 20 to use a reference webpage as a reference, and receiving the reference webpage meeting a preset match condition with the webpage and returned by the client terminal. After receiving the webpage accessing request input by a user, the client terminal 10 searches locally for the reference webpage meeting the preset match condition with the webpage. The reference webpage meeting the preset match condition may be a reference webpage reaching a preset matching degree with the webpage, and preferably, in some embodiments of the present invention, the reference webpage meeting the preset match condition uses a page completely matching with the webpage.

The receiving unit 30 receives the accessing request from the client terminal 10, when the client terminal 10 requests for accessing the webpage. The receiving unit 30 can further receive the notification of using the reference webpage as a reference sent by the client terminal 10 to the server 20, and the client terminal 10 notifies the server 20 to use the reference webpage as the reference.

The client terminal 10 receives the webpage accessing request from the user, and after receiving the accessing request of the user, the client terminal 10 searches locally for the reference webpage meeting the preset match condition with the webpage. After receiving the accessing request of the user and finding the reference webpage, the client terminal 10 sends to the server 20 the webpage accessing request and the notification that a reference webpage is found to serve as a reference.

The sending unit 40 is configured to send differential data to the client terminal 10, so that the client terminal 10 loads to obtain a complete webpage according to the reference webpage and the differential data, where the differential data is difference data between the webpage and the reference webpage.

After receiving the notification sent by the client terminal 10 that the reference webpage is found to serve as the reference, the receiving unit 30 sends the obtained differential data to the client terminal 10 through the sending unit 40, so that the client terminal 10 can load to obtain a complete webpage according to the received differential data and the reference webpage found from locally cached pages.

By means of the webpage loading method as described above, in case that a reference webpage can be found locally, the receiving unit 30 receives from the client terminal 10 the accessing request and the notification that the reference webpage is found, and after receiving the request and the notification, the sending unit 40 merely sends the differential data to the client terminal 10, and it is unnecessary to send whole page content of the webpage, thereby significantly saving transmission resources, and improving the webpage loading speed.

An embodiment of the present invention further provides a client terminal. The client terminal may be the client terminal in the embodiment shown in FIG. 1.

Figure 3:
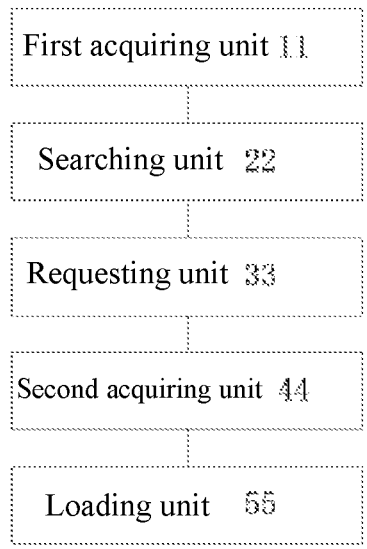
FIG. 3 is a schematic diagram of a client terminal according to a first embodiment of the present invention.

FIG. 3 is a schematic diagram of a client terminal according to a first embodiment of the present invention. As shown in the drawing, the client terminal includes a first acquiring unit 11, a searching unit 22, a requesting unit 33, a second acquiring unit 44, and a loading unit 55.

The first acquiring unit 11 is configured to acquire a webpage accessing request input by a user. The webpage accessing request input by the user may be a web address, of a webpage that needs to be accessed, input by the user. The first acquiring unit 11 can acquire the web address of the webpage.

The searching unit 22 is configured to search locally for a reference webpage meeting a preset match condition with the webpage. In the process of accessing webpages, the client terminal 10 may cache a large amount of webpage information, and the searching unit 22 may search the client terminal 10 locally for the reference webpage meeting the preset match condition with the webpage. Webpages accessed by the user are generally successive, and the large amount of webpage information cached in the client terminal 10 is stored successively according to time; therefore, searching may be performed according to repeated data of webpages accessed in adjacent times, thereby obtaining the reference webpage meeting the preset match condition.

The requesting unit 33 is configured to send the webpage accessing request to the server 20, and notifying the server 20 to use the reference webpage as a reference. After the searching of the searching unit 22, the requesting unit 33 may send the webpage accessing request to the server 20 so as to request for accessing the webpage, and notify the server 20 that a reference webpage has been found, and to use the found reference webpage as a reference.

The second acquiring unit 44 is configured to acquire differential data from the server 20, where the differential data is difference data between the webpage and the reference webpage. After receiving the request of accessing a webpage sent by the requesting unit 33 and the reference webpage, the server 20 may calculate the differential data according to the webpage and the reference webpage, and transmit the differential data to the client terminal 10. The second acquiring unit 44 in the client terminal 10 receives the differential data transmitted from the server 20, and prepares for loading the webpage.

The loading unit 55 is configured to load to obtain a complete webpage according to the reference webpage and the differential data. After the second acquiring unit 44 acquires the differential data, the loading unit 55 can load to obtain the complete webpage according to the reference webpage found locally from the client terminal 10 and the differential data from the server 20. The complete webpage obtained by loading may be obtained by performing conversion according to the reference webpage and the differential data.

Figure 4:
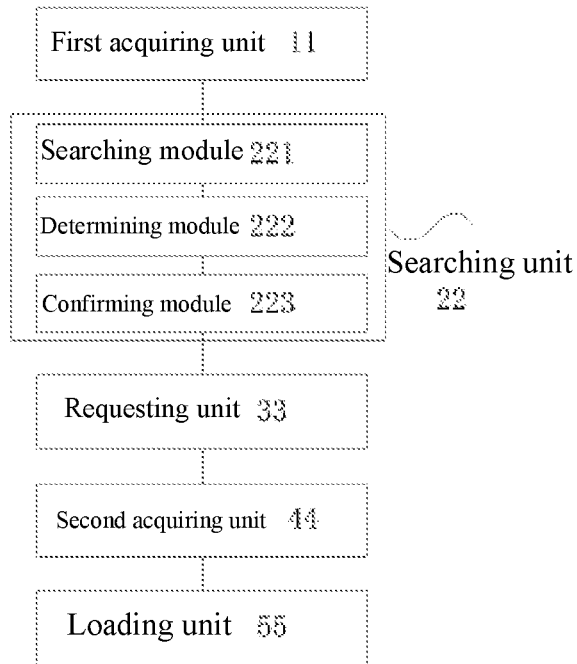
FIG. 4 is a schematic diagram of a client terminal according to a second embodiment of the present invention.

FIG. 4 is a schematic diagram of a client terminal according to a second embodiment of the present invention. As shown in the drawing, the client terminal includes a first acquiring unit 11, a searching unit 22, a requesting unit 33, a second acquiring unit 44, and a loading unit 55. The searching unit 22 includes a searching module 221, a determining module 222 and a confirming module 223.

The first acquiring unit 11, the requesting unit 33, the second acquiring unit 44, and the loading unit 55 in this embodiment are the same as the first acquiring unit 11, the requesting unit 33, the second acquiring unit 44, and the loading unit 55 in the embodiment shown in FIG. 3, and are not repeated here.

The searching module 221 is configured to search local cached page resources for a cached page according to an inverted time sequence of accessing. The searching module 221 can search the local cached page resources for a cached page, this is because when a user accesses pages, successive accessing occurs from one page to another page, accessing times of adjacent pages are adjacent, and therefore, in cached pages of the client terminal 10, generally, there is repeated webpage data in pages accessed at adjacent times.

The searching module 221 may search, according to a web address of a page that needs to be accessed input by the user, for a cached page according to an inverted time sequence of accessing. Repeated webpage data exists in pages accessed at adjacent times, and they have large similarity; therefore, it may be more rapid to search for the cached pages according to the inverted time sequence of accessing.

The determining module 222 is configured to determine whether the found cached page meets the preset match condition with the webpage. The determining module 222 may determine, according to a path matching algorithm, whether the found cached page meets the preset match condition with the webpage. The path matching algorithm performs path division according to the web address, and searches for a cached page meeting the preset match condition step by step. Pages under the same path generally have high similarity. Matching is started from the longest path, and if it is found that the current path meets the preset match condition with the web address of the webpage, a cached page corresponding to the current path may be used as a reference webpage; if it is found that the current path does not meet the preset match condition with the web address of the webpage, a path in a shorter level than the current path is searched continuously, and so on, to a root path, until a cached page meeting the preset match condition is found. The path in the embodiment of the present invention is a storage path of the cached page.

Searching for a cached page through path matching is described in the following via an example.

A web address to which a user requests for accessing is: i.ifeng.com/news/today/history/china/xxx.html, the extracted whole path of the web address is i.ifeng.com/news/today/history/china/, then, all cached page resources are searched locally by using i.ifeng.com/news/today/history/china/, and if no cached page matching with a first accessed webpage is found, all local cached page resources are searched by using i.ifeng.com/news/today/history/. A recursive operation is performed in this way, until a cached page meeting the preset match condition is found. If a corresponding template is still not found when i.ifeng.com/news is used, searching and matching are performed by using a web address i.ifeng.com, and if still no cached page meeting the preset match condition is found, it is determined that the client terminal 10 does not have a cached page that can be used as a reference webpage.

The confirming module 223 is configured to use the cached page meeting the preset match condition as the reference webpage. After the searching of the searching module 221 and the determination of the determining module 222, the confirming module 223 can use the cached page meeting the preset match condition as the reference webpage.

By means of the path matching algorithm, the cached page meeting the preset match condition can be found rapidly from the locally cached page resources, and the found cached page meeting the preset match condition is used as the reference webpage, thereby calculating the differential data.

Figure 5:
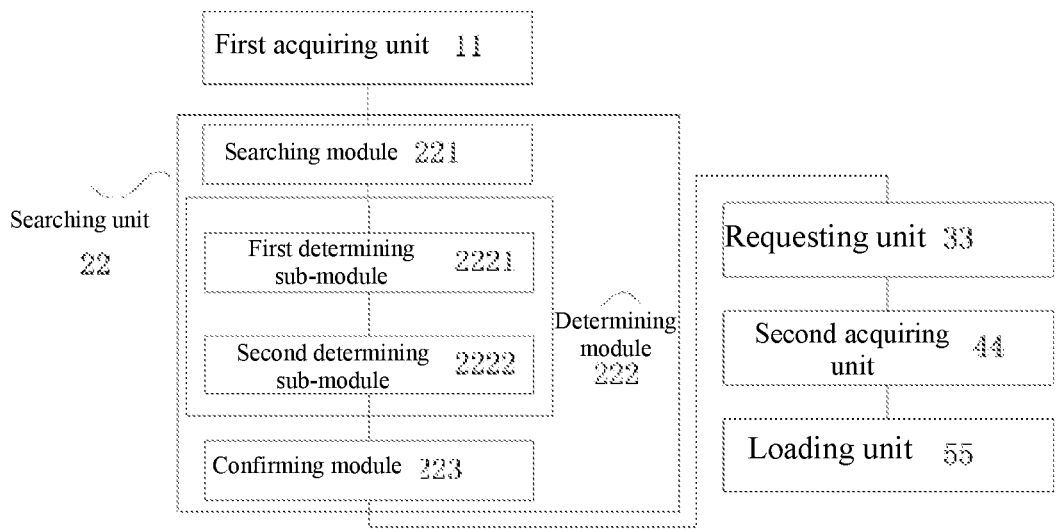
FIG. 5 is a schematic diagram of a client terminal according to a third embodiment of the present invention.

FIG. 5 is a schematic diagram of a client terminal according to a third embodiment of the present invention. This embodiment may serve as one of preferred implementation manners of the embodiment shown in FIG. 4. The client terminal includes a first acquiring unit 11, a searching unit 22, a requesting unit 33, a second acquiring unit 44, and a loading unit 55. The searching unit 22 includes a searching module 221, a determining module 222 and a confirming module 223. The determining module 222 includes a first determining sub-module 2221 and a second determining sub-module 2222.

The first determining sub-module 2221 is configured to start matching determination on whether the found cached page meets the preset match condition with the webpage from the longest path. Pages under the same path generally have high similarity, and therefore, it is more rapid to start matching from the longest path. In the process of searching the cached page resources, if it is found that the current path meets the preset match condition with the web address of the webpage, a cached page corresponding to the current path may be used as a reference webpage.

The second determining sub-module 2222 is configured to: if no cached page meeting the preset match condition is found according to the current path matching, continue matching determination on whether the searched cached page meets the preset match condition with the webpage on a shorter level of path. In the process of searching the cached page resources, if it is found that the current path cannot meet the preset match condition with the web address of the webpage, a path in a shorter level than the current path is searched continuously, and so on, to a root path, until a cached page meeting the preset match condition is found.

To ensure that the cached page served as the reference webpage is not deleted before the client terminal 10 notifies the server 20 to use the reference webpage as a reference, preferably, the client terminal 10 further includes a mapping unit, configured to establish a mapping relationship between the webpage and the reference webpage before sending the webpage accessing request to the server 20 and notifying the server 20 to use the reference webpage as a reference.

Preferably, the client terminal 10 further includes a deleting unit, configured to delete the mapping relationship between the webpage and the reference webpage after the client terminal 10 loads to obtain a complete webpage according to the reference webpage and the differential data, so as to facilitate maintenance of the mapping relationship.

An embodiment of the present invention further provides a page loading method.

The page loading method in the embodiment of the present invention may be executed by using the client terminal 10 or the server 20 provided in the embodiments of the present invention. The client terminal 10 and the server 20 provided in the embodiments of the present invention may also be used to execute a data statistical method provided in an embodiment of the present invention.

Figure 6:
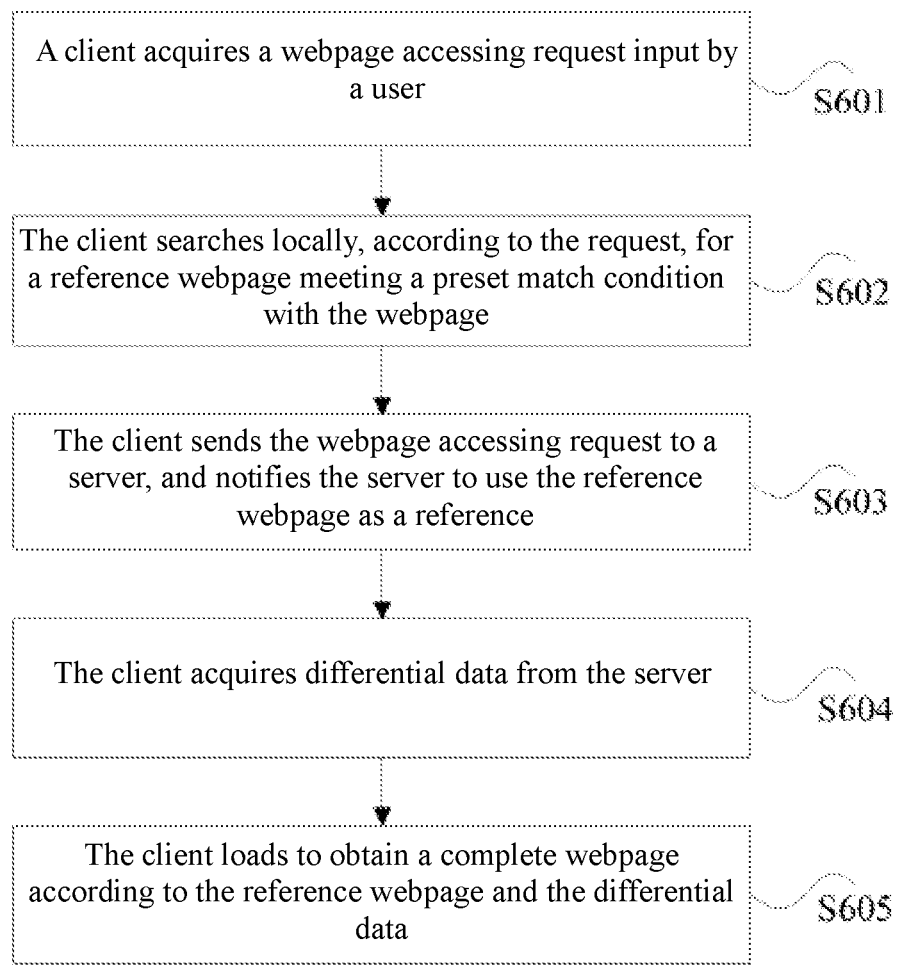
FIG. 6 is a flow chart of a page loading method according to a first embodiment of the present invention.

FIG. 6 is a flow chart of a first embodiment of a page loading method of the present invention. As shown in in the drawing, the method includes the following steps.

Step S601: A client terminal acquires a webpage accessing request input by a user. The webpage accessing request input by the user may be a web address, of a webpage that needs to be accessed, input by the user. The client terminal 10 can acquire the web address of the webpage.

Step S602: The client terminal searches locally, according to the request, for a reference webpage meeting a preset match condition with the webpage. In the process of accessing webpages, the client terminal 10 may cache a large amount of webpage information, and the searching unit 22 may search the client terminal 10 locally for the reference webpage meeting the preset match condition with the webpage. Webpages accessed by the user are generally successive, and the large amount of webpage information cached in the client terminal 10 is stored successively according to time; therefore, searching may be performed according to repeated data of webpages accessed in adjacent times, thereby obtaining the reference webpage meeting the preset match condition.

Step S603: The client terminal sends the webpage accessing request to a server, and notifies the server to use the reference webpage as a reference. The client terminal 10 may send to the server 20 the web address of the webpage to be accessed, so as to request for accessing the webpage, and notify the server 20 that a reference webpage has been found, and to use the found reference webpage as a reference.

Step S604: The client terminal acquires differential data from the server, where the differential data is difference data between the webpage and the reference webpage. After receiving the request of accessing a first webpage sent by the client terminal 10 and the reference webpage, the server 20 may calculate the differential data according to the webpage and the reference webpage, and transmit the differential data to the client terminal 10. The client terminal 10 receives the differential data transmitted from the server 20, and prepares for loading the webpage.

Step S605: The client terminal loads to obtain a complete webpage according to the reference webpage and the differential data. After the client terminal 10 acquires the differential data, the client terminal 10 can load to obtain the complete webpage according to the reference webpage found locally from the client terminal 10 and the differential data from the server 20. The complete webpage obtained by loading may be obtained by performing conversion according to the reference webpage and the differential data.

Figure 7:
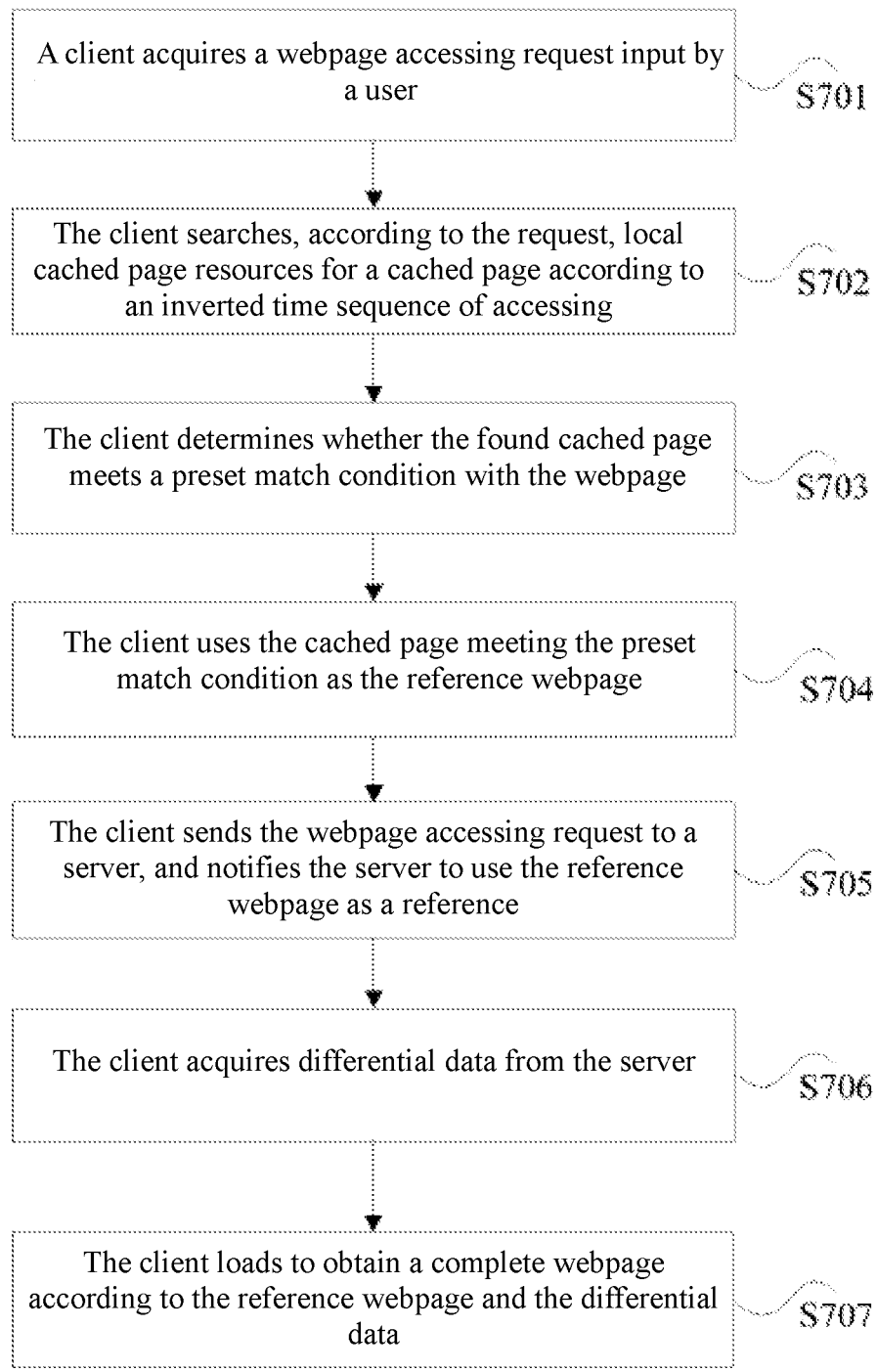
FIG. 7 is a flow chart of a webpage loading method according to a second embodiment of the present invention.

FIG. 7 is a flow chart of a second embodiment of a webpage loading method of the present invention. The embodiment shown in FIG. 7 may serve as a preferred implementation manner of the embodiment shown in FIG. 6, and as shown in the drawing, the method includes the following steps.

Step S701: A client terminal acquires a webpage accessing request input by a user. The webpage accessing request input by the user may be a web address, of a webpage that needs to be accessed, input by the user. The client terminal 10 can acquire the web address of the webpage.

Step S702: The client terminal searches, according to the request, local cached page resources for a cached page according to an inverted time sequence of accessing. The client terminal 10 can search the local cached page resources for a cached page, because when a user accesses pages, successive accessing occurs from one page to another page, accessing times of adjacent pages are adjacent, and therefore, in cached pages of the client terminal 10, generally, there is repeated webpage data in pages accessed at adjacent times.

The client terminal 10 may search, according to a web address of a page that needs to be accessed input by the user, for a cached page according to the inverted time sequence of accessing. Repeated webpage data exists in pages accessed at adjacent times, and they have large similarity; therefore, it may be more rapid to search for the cached pages according to the inverted time sequence of accessing.

Step S703: The client terminal determines whether the searched cached page meets the preset match condition with the webpage. The client terminal 10 may determine, according to a path matching algorithm, whether the found cached page meets the preset match condition with the webpage. The path matching algorithm performs path division according to the web address, and searches for the cached page meeting the preset match condition step by step. Pages under the same path generally have high similarity. Matching is started from the longest path, and if it is found that the current path meets the preset match condition with the web address of the webpage, a cached page corresponding to the current path may be used as a reference webpage; if it is found that the current path cannot meet the preset match condition with the web address of the webpage, a path in a shorter level than the current path is searched continuously, and so on, to a root path, until a cached page meeting the preset match condition is found.

Searching for a cached page through path matching is described in the following through an example.

A web address to which a user requests for accessing is i.ifeng.com/news/today/history/china/xxx.html, the extracted whole path of the web address is i.ifeng.com/news/today/history/china/, then, all cached page resources are searched locally by using i.ifeng.com/news/today/history/china/, and if no cached page matching with a first accessed webpage is found, all local cached page resources are searched by using i.ifeng.com/news/today/history/. A recursive operation is performed in this way, until a cached page meeting the preset match condition is found. If a corresponding template is still not found when i.ifeng.com/news is used, searching and matching are performed by using a web address i.ifeng.com, and if still no cached page meeting the preset match condition is found, it is determined that the client terminal 10 does not have a cached page that can be used as a reference webpage.

Step S704: The client terminal uses the cached page meeting the preset match condition as the reference webpage. After the searching and the matching determination, the client terminal 10 can use the cached page meeting the preset match condition as the reference webpage.

The step S705 to the step S707 in the embodiment shown in FIG. 7 are the same as the step S603 to the step S605 in the embodiment shown in FIG. 6, and are not repeated herein.

By means of the path matching algorithm, the cached page meeting the preset match condition can be found rapidly from the local cached page resources, and the found cached page meeting the preset match condition is used as the reference webpage, thereby calculating the differential data.

Figure 8:
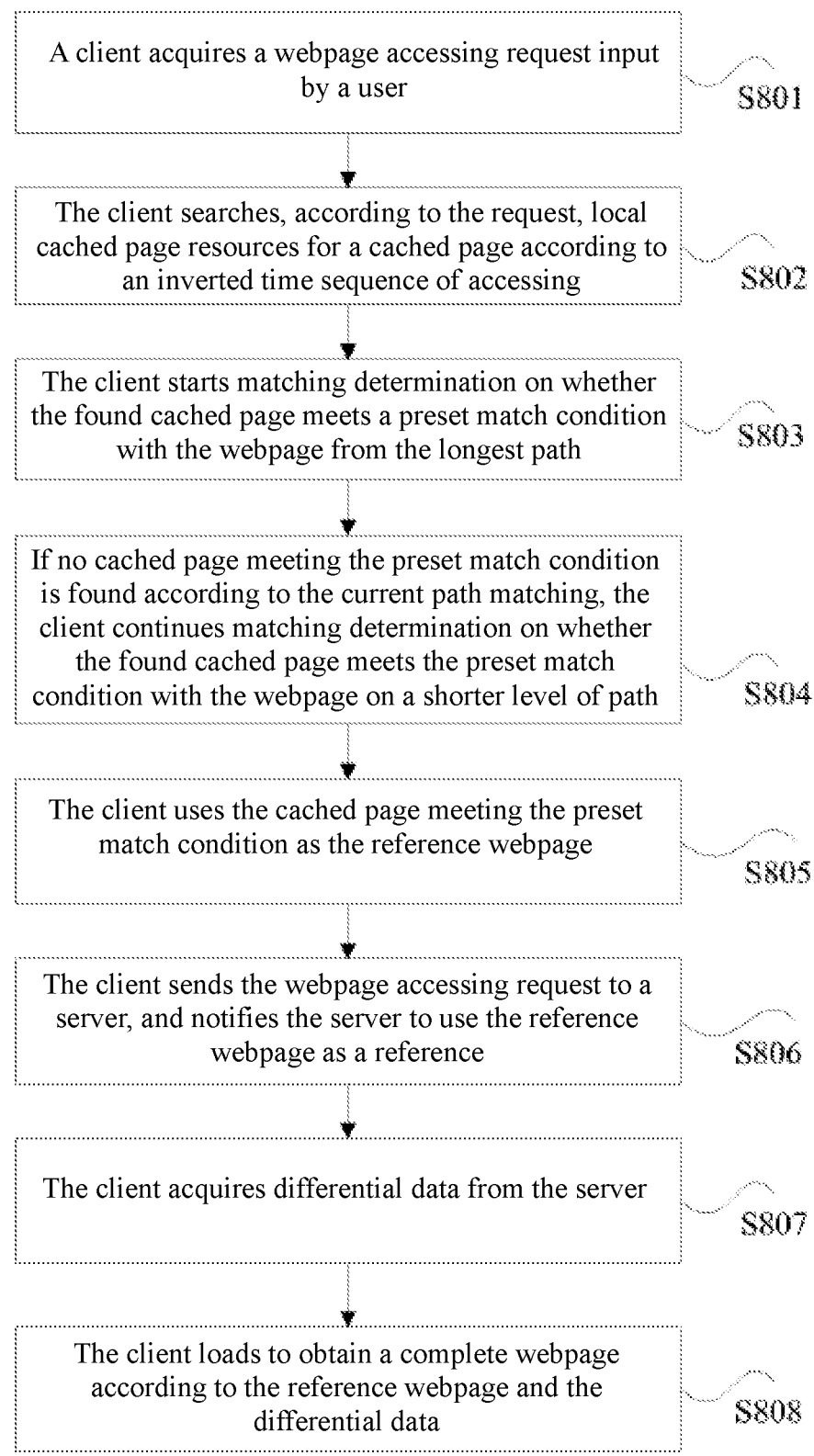
FIG. 8 is a flow chart of a webpage loading method according to a third embodiment of the present invention.

FIG. 8 is a flow chart of a third embodiment of a webpage loading method according to of the present invention. The embodiment shown in FIG. 8 may serve as a specific implementation manner of the embodiment shown in FIG. 7, and as shown in the drawing, the method includes the following steps.

Step S801: A client terminal acquires a webpage accessing request input by a user. The webpage accessing request input by the user may be a web address, of a webpage that needs to be accessed, input by the user. The client terminal 10 can acquire the web address of the webpage.

Step S802: The client terminal searches, according to the request, local cached page resources for a cached page according to an inverted time sequence of accessing. The client terminal 10 can search the local cached page resources for a cached page, because when a user accesses pages, successive accessing occurs from one page to another page, accessing times of adjacent pages are adjacent, and therefore, in cached pages of the client terminal 10, generally, there is repeated webpage data in pages accessed at adjacent times.

The client terminal 10 may search, according to a web address of a page that needs to be accessed input by the user, for a cached page according to the inverted time sequence of accessing. Repeated webpage data exists in pages accessed at adjacent times, and they have large similarity; therefore, it may be more rapid to search for the cached pages according to the inverted time sequence of accessing.

Step S803: The client terminal starts matching determination on whether the searched cached page meets the preset match condition with the webpage from the longest path. Pages under the same path generally have high similarity, and therefore, it is more rapid to start matching from the longest path. In the process of searching the cached page resources, if it is found that the current path meets the preset match condition with the web address of the webpage, a cached page corresponding to the current path may be used as a reference webpage.

Step S804: If no cached page meeting the preset match condition is found according to the current path matching, the client terminal continues matching determination on whether the searched cached page meets the preset match condition with the webpage on a shorter level of path. In the process of searching the cached page resources, if it is found that the current path cannot meet the preset match condition with the web address of the webpage, a path in a shorter level than the current path is searched continuously, and so on, until a root path is searched, until a cached page meeting the preset match condition is found.

The step S805 to the step S808 in the embodiment shown in FIG. 8 are the same as the step S704 to the step S707 in the embodiment shown in FIG. 7, and are not repeated herein.

To ensure that the cached page served as the reference webpage is not deleted before the client terminal 10 notifies the server 20 to use the reference webpage as a reference, preferably, before the client terminal 10 sends the webpage accessing request to the server 20 and notifies the server 20 to use the reference webpage as a reference, the webpage loading method further includes: establishing a mapping relationship between the webpage and the reference webpage.

To facilitate maintenance of the mapping relationship, preferably, after the client terminal 10 loads to obtain a complete webpage according to the reference webpage and the differential data, the webpage loading method further includes: deleting the mapping relationship between the webpage and the reference webpage.

An embodiment of the present invention further provides a computer storage medium. The computer storage medium may store a program, and the program, when executed by a processor, is configured to perform a part or all of the steps in the webpage loading method.

It should be noted that, for ease of description, the method embodiments mentioned above are all described as a series of action combinations; however, persons skilled in the art should know that the present invention is not limited to the action order described herein, and some steps may be performed in other orders or simultaneously according to the present invention. Persons skilled in the art should also know that the embodiments described in the specification are preferred embodiments, and actions and modules involved therein are not necessary for the present invention.

In the above embodiments, descriptions of the embodiments each have emphases, and a part that is not described in detail in one embodiment may be obtained with reference to related descriptions in other embodiments.

In the several embodiments provided in the present application, it should be understood that, the disclosed apparatus may be implemented in other manners. For example, the apparatus embodiments described in the foregoing are merely exemplary. For example, the division of units is merely division of logic functions, and in fact, there may be other division manners during implementation. As an example, multiple units or components may be combined or may be integrated into another system, or some features may be omitted or not be executed. On the other hand, the displayed or discussed coupling or direct coupling or communication connection between them may be implemented through some interfaces, and indirect coupling or communication connection between apparatuses or units, and may be in the form of electrical or other forms.

Units described as separated parts may be or may not be physically separated, parts displayed as units may be or may not be physical units, and they may be located at the same place, or be distributed to multiple network units. The objective of the solution of this embodiment may be implemented by selecting a part of or all units thereof according to actual requirements.

In addition, various function units in the embodiments of the present invention can be integrated in one processing unit, each unit may also exists as a separated physical presence, and two or more units may also be integrated in one unit. The integrated unit may be implemented in a form of hardware, and may also be implemented in a form of a software function unit.

The integrated unit, if it is implemented in a form of a software functional unit and sold or used as an independent product, may be stored in a computer readable storage medium. Based on such an understanding, the technical solutions of the present invention essentially, or the part contributing to the prior art, or all or a part of the technical solution may be implemented in a form of a software product. The computer software product may be stored in a storage medium, and includes several instructions for instructing a computer device (which may be a personal computer, a server, or a network device) to execute all or a part of steps in the methods described in the embodiments of the present invention. The storage medium includes: a USB flash disk, a Read-Only Memory (ROM), a Random Access Memory (RAM), a mobile hard disk, a magnetic disk, an optical disc, or other mediums that can store program code.

The program used to execute the webpage loading method according to the embodiment of the present invention may be stored in a computer readable storage medium. Therefore, an embodiment of the present invention further provides a computer readable storage medium, and the computer readable storage medium stores a program used to execute the webpage loading method in the embodiment of the present invention. Correspondingly, in an embodiment of the present invention, a computer readable storage medium having program code executable by a processor is provided, and when being executed, the program code enables the processor to execute the following steps: acquiring a webpage accessing request input by a user; searching locally, according to the request, for a reference webpage meeting a preset match condition with the webpage; sending the webpage accessing request to a server, and notifying the server to use the reference webpage as a reference; acquiring differential data from the server, where the differential data is difference data between the webpage and the reference webpage; and loading to obtain a complete webpage according to the reference webpage and the differential data. In still another embodiment of the present invention, a computer readable storage medium having program code executable by a processor is further provided, and when being executed, the program code enables the processor to execute the following steps: receiving a request and a notification from a client terminal, the request being a webpage accessing request and the notification being a notification notifying the server to use a reference webpage as a reference, and receiving the reference webpage meeting a preset match condition with the webpage and returned by the client terminal; and sending differential data to the client terminal, so that the client terminal loads to obtain a complete webpage according to the reference webpage and the differential data, where the differential data is difference data between the webpage and the reference webpage.

Moreover, typically, the mobile terminal described in the present invention may be various handhold terminal devices, such as a mobile phone and a personal digital assistant (PDA). Therefore, the protection scope of the present invention should not be limited by a specific type of mobile terminal.

Moreover, the method according to the present invention may also be implemented as a computer program executed by a CPU. When the computer program is executed by the CPU, the above functions limited in the method of the present invention are executed.

Moreover, the method steps and system units may also be implemented by using a controller and a computer readable storage device configured to store a computer program enabling the controller to implement the above steps or unit functions.

Moreover, it should be noted that, the computer readable storage device (for example, a memory) may be a volatile memory or a non-volatile memory, or may include both a volatile memory and a non-volatile memory. As a non-limitative example, the non-volatile memory may include a red-only memory (ROM), a programmable ROM (PROM), an electrically programmable ROM (EPROM), an electrically erasable and programmable ROM (EEPROM), or a flash memory. The volatile memory may include a random access memory (RAM), and the RAM may serve as an external cache memory. As a non-limitative example, the RAM may be acquired in various forms, for example, a synchronous RAM (DRAM), a dynamic RAM (DRAM), a synchronous DRAM (SDRAM), a double data rate SDRAM (DDRSDRAM), an enhanced SDRAM (ESDRAM), a synchronous link DRAM (SLDRAM), and a direct Rambus RAM (DRRAM). The disclosed storage devices are intended to include, but not limited to, these and other appropriate types of memories.

Various exemplary logic blocks, units and circuits described in the disclosure may be implemented or executed by using the following components designed to execute the functions: a general-purpose processor, a digital signal processor (DSP), an application-specific integrated circuit (ASIC), a field-programmable gate array (FPGA), or other programmable logic devices, separate gates or transistor logics, separate hardware components, or any combination of the parts. The general-purpose processor may be a microprocessor, but alternatively, the processor may be any conventional processor, controller, micro controller or state machine. The processor may also be implemented as a combination of computing devices, for example, a combination of a DSP and a microprocessor, multiple microprocessors, one or more microprocessors in combination with a DSP core, or any other such configuration.

The steps of the method or algorithm described in the disclosure may be directly included in hardware, software units executed by the processor, or a combination of the two. The software units may reside in a RAM memory, a flash memory, a ROM memory, an EPROM memory, an EEPROM memory, a register, a hard disk, a mobile disk, a CD-ROM, or a storage medium in any other form well-known in the field. The exemplary storage medium is coupled to the processor, so that the processor can read information from the storage medium or write information to the storage medium. In an alternative solution, the storage medium may be integrated with the processor. The processor and the storage medium may reside in an ASIC. The ASIC may reside in a user terminal. In an alternative solution, the processor and the storage medium may reside in a user terminal as separate components.

In one or more exemplary designs, the function may be implemented in hardware, software, firmware, or any combination thereof. If it is implemented in the software, the function may be stored in a computer readable medium as one or more instructions or code or may be transmitted by a computer readable medium. The computer readable medium includes a computer storage medium and a communication medium, and the communication medium includes any medium that is conducive to transmission of a computer program from one position to another position. The storage medium may be any available medium that can be accessed by a general or dedicated computer. As a non-limitative example, the computer readable storage medium may include a RAM, a ROM, an EEPROM, a CD-ROM, or another optical disc storage device, a magnetic disk storage device, or another magnetic storage device, or may be any other medium that can be used to carry or store a required program code in a form of an instruction or a data structure and can be accessed by a general or dedicated computer or a general or dedicated processor. Moreover, any connection may be properly referred to as a computer readable storage medium. For example, if a coaxial cable, an optical fiber cable, a twisted pair cable, a digital subscriber line (DSL), or a wireless technology such as infrared, radio and microwave is used to send software from a web site, a server or another remote source, the coaxial cable, the optical fiber cable, the twisted pair cable, the DSL, or the wireless technology such as infrared, radio and microwave are all included in the definition of the medium. As used herein, the magnetic disk and the optical disc include a compact disc (CD), a laser disc, an optical disc, a digital versatile disc (DVD), a floppy disk, and a blue-ray disc. The magnetic disk generally reproduces data magnetically, and the optical disc reproduces data optically by using laser. Combinations of the above content should be included in the scope of the computer readable storage medium.

The above descriptions are merely preferred embodiments of the present invention, and are not intended to limit the present invention. For persons skilled in the art, the present invention may have various modifications and variations. Any modification, equivalent replacement, improvement or the like made without departing from the spirit and principle of the present invention shall fall within the scope of claims of the present invention.

The invention claimed is:

1. A webpage loading method, comprising:
    acquiring, by a client terminal, a webpage accessing request by a user, wherein the webpage accessing request includes an address to a webpage;
    searching, by the client terminal, according to the webpage accessing request, locally cached webpages for a cached webpage that matches the webpage corresponding to the webpage accessing request, wherein the locally cached webpages are searched based on an inverted time sequence of accessing, and wherein the searching the locally cached webpages for the cached webpage comprises:
        determining, based on the address, a string with which to search the locally cached webpages, wherein the string is generated based on the address and corresponds to a portion of the address; and
        recursively searching, based on the string, the locally cached webpages until the cached webpage is found, wherein recursively searching the locally cached webpages comprises:
            performing one or more searches on the locally cached webpages until the cached webpage is found, wherein performing the one or more searches comprises:
                if a cached webpage is found based on the string, terminating the one or more searches, wherein the string specifies a first path associated with the address and the first path is a longest path allowable based on the address;
                if no cached webpage is found based on the string, truncating the string to a second string, wherein the second string specifies a second path associated with the address and the second path is truncated from the first path based on a demarcation indicated by a right-most backslash in the string, wherein the one or more searches, based on the second string, are continued until a cached webpage is found or a root address is reached; and
                if the root address is reached and no cached webpage is found, terminating the one or more searches and determining that the client terminal does not have a cached webpage capable of being used as a reference webpage;
    sending, by the client terminal, in response to finding the cached webpage in the locally cached webpages, a notification to a server, wherein the notification includes an indication that the cached webpage has been found;
    acquiring, by the client terminal, differential data from the server, wherein the differential data completes the webpage referenced in the webpage accessing request by filling in data missing in the cached webpage; and
    loading, by the client terminal, the completed webpage for the user.

2. The webpage loading method according to claim 1, further comprising:
    in response to finding the cached webpage locally on the client terminal, calculating, by the server, the differential data based on a difference between the webpage and the cached webpage, and wherein the sending the webpage accessing request to the server comprises: sending, by the server to the client terminal, only the differential data without sending a whole page content of the webpage.

3. The webpage loading method according to claim 1, wherein, the cached webpage completely matches with the webpage.

4. The webpage loading method according to claim 1, wherein searching, by the client terminal, according to the webpage accessing request, the locally cached webpages for the cached webpage that matches the webpage, comprises:
   checking for a match between the webpage and the locally cached webpages according to the inverted time sequence of accessing, wherein checking for the match comprises:
      checking whether a first webpage of the locally cached webpages at a most recent time matches the webpage according to a preset match condition;
      successively checking for a match between the webpage and webpages adjacent to and immediately prior to the first webpage, sequentially from more recent to later webpages; and
      in response to finding a match between one of the webpages of the locally cached webpages and the webpage, setting the one of the webpages to be the cached webpage and terminating the searching.

5. The webpage loading method according to claim 1, wherein the searching, by the client terminal, according to the webpage accessing request, the locally cached webpages for the cached webpage that match the webpage, comprises:
   checking for a match between the webpage and the locally cached webpages according to the inverted time sequence of accessing, wherein checking for the match comprises:
      checking whether a first webpage of the locally cached webpages at a most recent time matches the webpage according to a preset match condition, by determining whether an address of the first webpage matches an untruncated address of the webpage;
      successively checking for a match between the webpage and webpages adjacent to and immediately prior to the first webpage, sequentially from more recent to later webpages, by determining whether one of the webpages has an address that matches the untruncated address of the webpage; and
      in response to finding a match between one of the webpages of the locally cached webpages and the webpage, setting the one of the webpages to be the cached webpage and terminating the searching;
      if no cached webpage is found, creating a series of the truncated addresses of the webpage by detecting separate words comprising the untruncated address and successively removing one or more of the separate words from the untruncated address; and
      searching for a match between the one of the webpages of the locally cached webpages and one of the truncated addresses according to the inverted time sequence of accessing.

6. The webpage loading method according to claim 5, wherein the inverted time sequence of accessing comprises times at which each cached webpage of the locally cached webpages was last accessed on the client terminal.

7. The webpage loading method according to claim 1, further comprising:
   determining, by the client terminal, a mapping relationship between the cached webpage and the webpage referenced in the webpage access request, wherein the mapping relationship includes an indication of the data missing in the cached webpage to complete the webpage referenced in the webpage access request.

8. The webpage loading method according to claim 7, wherein the notification to the server further includes the mapping relationship.

9. The webpage loading method according to claim 7, further comprising:
   deleting, by the client terminal, the mapping relationship upon providing the completed webpage to the user.

10. A client terminal comprising:
   one or more processors; and
   a memory storing program codes that, when executed by the one or more processors, cause the client terminal to perform a webpage loading method, comprising:
   acquiring a webpage accessing request by a user, wherein the webpage accessing request includes an address to a webpage;
   searching, according to the webpage accessing request, locally cached webpages for a cached webpage that matches the webpage corresponding to the webpage accessing request, wherein the locally cached webpages are searched based on an inverted time sequence of accessing, and wherein the searching the locally cached webpages for the cached webpage comprises:
      determining, based on the address, a string with which to search the locally cached webpages, wherein the string is generated based on the address and corresponds to a portion of the address; and
      recursively searching, based on the string, the locally cached webpages until the cached webpage is found, wherein recursively searching the locally cached webpages comprises:
         performing one or more searches on the locally cached webpages until the cached webpage is found, wherein performing the one or more searches comprises:
            if a cached webpage is found based on the string, terminating the one or more searches, wherein the string specifies a first path associated with the address and the first path is a longest path allowable based on the address;
            if no cached webpage is found based on the string, truncating the string to a second string, wherein the second string specifies a second path associated with the address and the second path is truncated from the first path based on a demarcation indicated by a right-most backslash in the string, wherein the one or more searches, based on the second string, are continued until a cached webpage is found or a root address is reached; and
            if the root address is reached and no cached webpage is found, terminating the one or more searches and determining that the client terminal does not have a cached webpage capable of being used as a reference webpage;
   sending, in response to finding the cached webpage in the locally cached webpages, a notification to a server, wherein the notification includes an indication that the cached webpage has been found;
   acquiring differential data from the server, wherein the differential data completes the webpage referenced in the webpage accessing request by filling in data missing in the cached webpage; and
   loading the completed webpage for the user.

11. A non-transitory computer readable storage medium having program codes executable by a processor, wherein, when executed, the program codes enable the processor to execute the following steps:

acquiring a webpage accessing request by a user, wherein the webpage access request includes an address to a webpage;

searching, according to the webpage accessing request, locally cached webpages for a cached webpage that matches the webpage corresponding to the webpage accessing request, wherein the locally cached webpages are searched based on an inverted time sequence of accessing, and wherein the searching the locally cached webpages for the cached webpage comprises:

determining, based on the address, a string with which to search the locally cached webpages, wherein the string is generated based on the address and corresponds to a portion of the address; and recursively searching, based on the string, the locally cached webpages until the cached webpage is found, wherein recursively searching the locally cached webpages comprises:

performing one or more searches on the locally cached webpages until the cached webpage is found, wherein performing the one or more searches comprises:

if a cached webpage is found based on the string, terminating the one or more searches, wherein the string specifies a first path associated with the address and the first path is a longest path allowable based on the address;

if no cached webpage is found based on the string, truncating the string to a second string, wherein the second string specifies a second path associated with the address and the second path is truncated from the first path based on a demarcation indicated by a right-most backslash in the string, wherein the one or more searches, based on the second string, are continued until a cached webpage is found or a root address is reached; and if the root address is reached and no cached webpage is found, terminating the one or more searches and determining that the client terminal does not have a cached webpage capable of being used as a reference webpage;

sending, in response to finding the cached webpage in the locally cached webpages, a notification to a server, wherein the notification includes an indication that the cached webpage has been found;

acquiring differential data from the server, wherein the differential data completes the webpage referenced in the webpage accessing request by filling in data missing in the cached webpage; and loading the completed webpage for the user.

12. The non-transitory computer readable storage medium of claim 11, wherein the searching, according to the webpage accessing request, the locally cached webpages for the cached webpage that matches the webpage, comprises:

checking for a match between the webpage and in the locally cached webpages according to the inverted time sequence of accessing, wherein checking for the match comprises:

checking whether a first webpage of the locally cached webpages at a most recent time matches the webpage according to a preset match condition;

successively checking for a match between the webpage and webpages adjacent to and immediately prior to the first webpage, sequentially from more recent to later webpages; and in response to finding a match between one of the webpages of the locally cached webpages and the webpage, setting the one of the webpages to be the cached webpage and terminating the searching.

13. The non-transitory computer readable storage medium of claim 11, wherein the searching, according to the webpage accessing request, the locally cached webpages for the cached webpage that match the webpage, comprises:

checking for a match between the webpage and the locally cached webpages according to the inverted time sequence of accessing, wherein checking for the match comprises:

checking whether a first webpage of the locally cached webpages at a most recent time matches the webpage according to a preset match condition, by determining whether an address of the first webpage matches an untruncated address of the webpage;

successively checking for a match between the webpage and webpages adjacent to and immediately prior to the first webpage, sequentially from more recent to later webpages, by determining whether one of the webpages has an address that matches the untruncated address of the webpage; and in response to finding a match between one of the webpages of the locally cached webpages and the webpage, setting the one of the webpages to be the cached webpage and terminating the searching;

if no cached webpage is found, creating a series of the truncated addresses of the webpage by detecting separate words comprising the untruncated address and successively removing one or more of the separate words from the untruncated address; and searching for a match between the one of the webpages of the locally cached webpages and one of the truncated addresses according to the inverted time sequence of accessing.

14. The non-transitory computer readable storage medium of claim 13, wherein the creating the series of the truncated addresses of the webpage comprises:

creating a first truncated address by removing a separate word closest to an end of the untruncated address; and sequentially creating each truncated address from other truncated addresses by removing a separate word closest to an end of the other truncated addresses until a truncated address corresponding to a root path is obtained.

15. The non-transitory computer readable storage medium of claim 11, wherein the loading the completed webpage for the user causes a mapping relationship between the webpage and the cached webpage to be deleted.

* * * * *